Jan. 10, 1933.  J. S. BEEKLEY  1,893,490
GAS ANALYSIS
Filed April 23, 1928
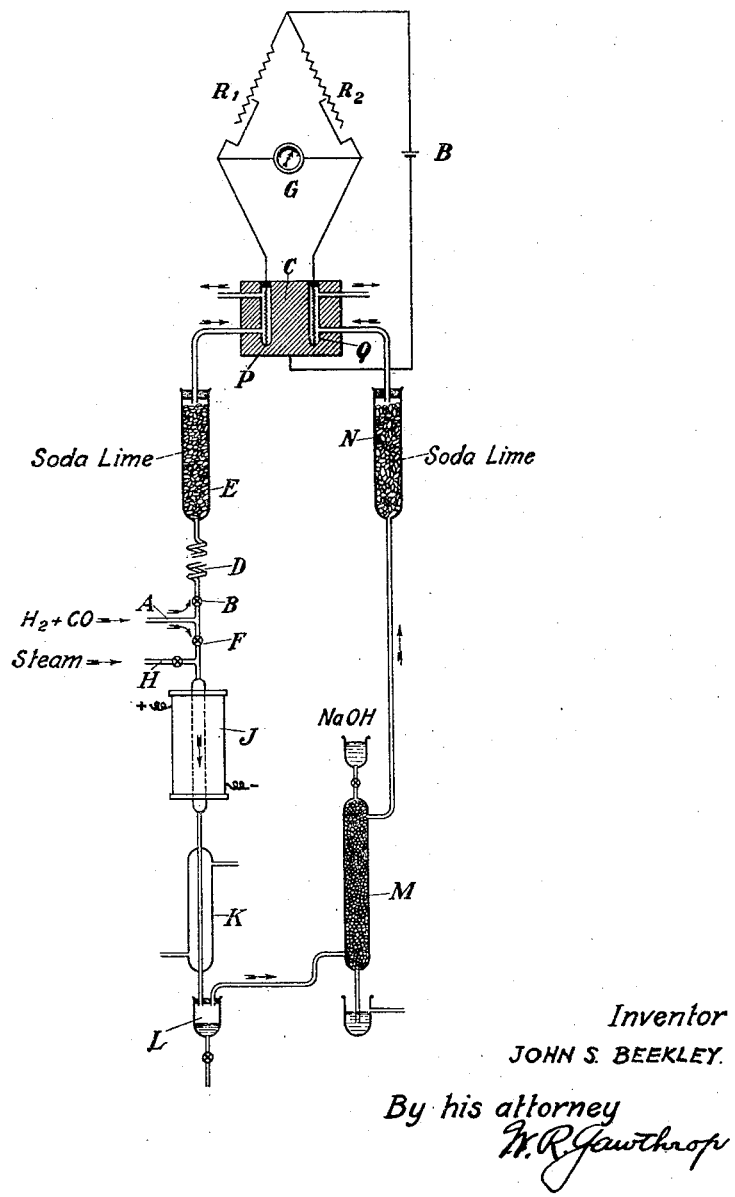
Inventor
JOHN S. BEEKLEY.
By his attorney Patented Jan. 10, 1933

1,893,490

UNITED STATES PATENT OFFICE

JOHN S. BEEKLEY, OF CHARLESTON, WEST VIRGINIA, ASSIGNOR, BY MESNE ASSIGNMENTS, TO E. I. DU PONT DE NEMOURS & COMPANY, OF WILMINGTON, DELAWARE, A CORPORATION OF DELAWARE

GAS ANALYSIS

Application filed April 23, 1928. Serial No. 272,118.

This invention relates to the analysis of gases and particularly to the automatic analysis of gaseous mixtures.

Various methods have been proposed for the automatic analysis of gases. These include chemical methods in which the constituent to be determined is absorbed by means of a chemical re-agent and the amount absorbed is measured either volumetrically by observing the decrease in the volume of the gas or gravimetrically by measuring the increase in weight of the chemical re-agent; and also physical methods depending upon the measurement of the density, electric conductivity, or thermal conductivity of the gas. Of the various methods proposed the thermal conductivity method is best adapted for the automatic analysis of many types of industrial gaseous mixtures including, for instance, the determination of carbon monoxide in hydrogen-containing gases, such as water gas, the determination of ammonia in mixtures of hydrogen and nitrogen existing in a synthetic ammonia plant, the determination of carbon dioxide in air, etc.

The thermal conductivity method of automatically analyzing gases has been described in detail by Palmer and Weaver, Technological Paper of the Bureau of Standards No. 249 (1924). This method consists essentially in determining the thermal conductivity of the gas to be analyzed by measuring the electrical resistance of a heated wire immersed in the gas as compared with the resistance of a similar wire immersed in a reference gas. In a particularly convenient embodiment of this method two thermal conductivity cells are connected as two sides of a Wheatstone bridge. Through one of these cells the gas to be analyzed is passed and through the other cell the same gas is passed after removal, by chemical or other means, of the constituent to be determined. The two resistances constituting the other sides of the Wheatstone bridge being proportioned so that the bridge is balanced when gases of identical composition are in the two conductivity cells, the degree of unbalance of the bridge, as measured by a galvanometer, indicates the composition of the gas undergoing analysis.

It is the object of the present invention to provide an improved method of and apparatus for automatically analyzing gaseous mixtures.

A further object of the invention is to provide an improved method for automatically determining carbon monoxide in gaseous mixtures containing the same.

Other objects and advantages of the invention will be apparent as it is better understood by reference to the following specification in which its details and preferred embodiments are described.

In accordance with the invention the stream of gas going to the analyzer is divided into two portions; one passes directly to a thermal conductivity cell and the other, after removal of the constituent X to be determined, passes to a second thermal conductivity cell. These two cells are connected as two elements of a Wheatstone bridge, the state of balance of which indicates, in the manner above referred to, the concentration of the constituent X. By this method a more accurate analysis of a gaseous stream of varying composition can be obtained than by the prior methods. For, whereas by the method heretofore used the determination was necessarily based on a comparison of the thermal conductivity of a portion of the total gaseous mixture with that of another and earlier portion from which the constituent X had been removed, the present method involves the comparison of more nearly contemporaneous samples of gas. Furthermore, in order to compensate for the fact that a certain amount of time is required for the removal of the constituent X from the portion of the gas going to the second of the aforementioned cells, an artificial lag is employed in the path of the gas going to the first of the cells. That is to say, the path of this gas is lengthened to compensate for the otherwise longer time required for the other portion of gas to reach its conductivity cell. Thus the analysis is based upon the measurement of thermal conductivities of contemporaneous portions of the same gas. By this method a reliable and continuous record may be had of the analysis of a gas stream of fluctuating composition. This is especially valuable in many chemical processes where the changes in composition of the gaseous reactants or products of the reaction are used to control the temperature, pressure and/or other conditions of the operation.

A further feature of the invention resides in the application of the method as above described to the automatic determination of carbon monoxide in gaseous mixtures containing hydrogen and carbon monoxide, such as may be derived from water gas and the like. It is known that the sensitivity of the thermal conductivity method can be increased by substituting for the constituent that is removed an equal volume of one of the other constituents of the gaseous mixture. Thus, for example, in the determination of carbon monoxide by the method as described by Palmer and Weaver the carbon monoxide is removed from the gas by combustion with oxygen and is then replaced by an equivalent volume of hydrogen, so that into one of the conductivity cells there passes the original gas and into the other the same portion of gas in which the carbon monoxide has been replaced by an equal volume of hydrogen. This method requires the introduction of two gaseous re-agents, hydrogen and oxygen, and necessitates in addition two combustion furnaces one for combustion of carbon monoxide with oxygen and the other for combustion of the excess oxygen with hydrogen.

In accordance with the present invention the removal of carbon monoxide and addition of an equal volume of hydrogen is accomplished in one step and with the use of but one, and that a very readily available, reagent. For this purpose the gas is passed together with steam over a catalyst capable of converting steam and carbon monoxide to hydrogen and carbon dioxide. After removal of the excess steam and the carbon dioxide the gas is passed to a thermal conductivity cell, the analytical measurement being accomplished in the manner hereinbefore described.

Although the invention is susceptible of wide variation, particularly in the specific manner in which it may be applied to the analysis of various gaseous mixtures, for the purpose of illustration it will be described in its application to the determination of carbon monoxide in a gaseous mixture of carbon monoxide and hydrogen. The method of applying the invention to this use will be understood from the following description and the accompanying drawing in which—

The principal features of the apparatus are a catalytic reaction tube J for converting carbon monoxide and steam to hydrogen and carbon dioxide, a condenser K, a caustic scrubbing tower M, soda lime drying towers E and N and a thermal conductivity unit C. This last is of the well known type described in U. S. Patent No. 1,304,208 and consists of two cells P and Q mounted in a metallic block. The cell unit is in a Wheatstone bridge circuit comprising variable resistances $R_1$ and $R_2$, a galvanometer G and a source of current B. The stream of gas to be analyzed (consisting of hydrogen containing, for example, about 1 to 10% carbon monoxide) arrives at A and is divided into two portions. One portion flows through the valve B and the artificial lag D to the soda lime tower E in which moisture and traces of carbon dioxide are removed. Thence it passes through the cell P of the thermal conductivity unit C. The artificial lag referred to consists of a gas conduit of such length that the time required for gas to pass from A to C is the same by way of B, D and E as by way of F, J, K and N. The balance of the gas arriving at A goes through the valve F to be mixed with steam introduced through the valve H. The steam is added in the ratio of at least eight volumes to each volume of carbon monoxide in the gaseous mixture being analyzed. The mixture of steam, hydrogen and carbon monoxide then passes through the catalytic apparatus J containing chromium oxide catalyst maintained at a substantially constant temperature of about 500° C. The gaseous mixture leaving J is cooled in the condenser K to remove therefrom the excess steam which latter is collected as water in the trap L. In the packed tower M the gas is washed with a descending stream of caustic soda solution to remove carbon dioxide. Leaving M the gas traverses the soda lime tower N in which remaining traces of carbon dioxide and water are eliminated. The dry gas then flows through the cell Q of the thermal conductivity unit C. The resistances $R_1$ and $R_2$ are previously adjusted so that the bridge is balanced when gases of the same composition are passed through the two cells P and Q. Accordingly when hydrogen containing carbon monoxide is passed through the apparatus the galvanometer G indicates the degree of unbalance of the bridge, which is a measure of the carbon monoxide content of the gas. The galvanometer G may conveniently be of the recording type so that a continuous record of the variation of composition of the gaseous stream may be had.

Various changes may be made in the method and apparatus described without departing from the invention or sacrificing any of the advantages thereof.

I claim:

1. The method of automatically determining carbon monoxide in a gaseous stream containing hydrogen and carbon monoxide, which comprises comparing the thermal conductivity of one portion of said gaseous stream with that of a contemporaneously taken portion after replacing the carbon monoxide in the latter with hydrogen by subjecting it to catalysis with steam and removing the excess steam and carbon dioxide formed.

2. The method of automatically determining carbon monoxide in a gaseous stream containing hydrogen and carbon monoxide, which comprises comparing the thermal conductivity of one portion of said gaseous stream with that of a contemporaneously taken portion after replacing the carbon monoxide in the latter with hydrogen by subjecting it to catalysis with steam and removing the excess steam and carbon dioxide formed, the moisture being removed from both gaseous streams by absorption as well as the carbon dioxide and substantially all of the carbon monoxide from the gaseous stream which has been subjected to catalytic treatment prior to determining their heat conductivity.

3. The method of automatically determining carbon monoxide in a gaseous stream containing hydrogen and carbon monoxide, which comprises dividing the stream into two portions, adding an excess of steam to one of said portions and converting the carbon monoxide therein and a portion of the added stream to hydrogen and carbon dioxide by passing the resulting mixture over a catalyst for the reaction—

$$H_2O + CO = H_2 + CO_2,$$

successively removing unreacted steam and formed carbon dioxide from the reaction products and thereafter comparing the thermal conductivity of the thus modified portion of the gaseous stream with that of the second of said portions.

4. The method of automatically determining carbon monoxide in a gaseous stream containing hydrogen and carbon monoxide, which comprises dividing the stream into two portions, adding an excess of steam to one of said portions and converting the carbon monoxide therein and a portion of the added stream to hydrogen and carbon dioxide by passing the resulting mixture over a catalyst for the reaction—

$$H_2O + CO = H_2 + CO_2,$$

successively condensing and thereby removing unreacted steam from the reaction products, absorbing carbon monoxide therefrom, and conveying the thus modified mixture thru a thermal conductivity cell; simultaneously conveying the other of said gaseous portions thru a second thermal conductivity cell, contemporaneously taken portions traversing their respective cells substantially simultaneously; and measuring the ratio of the electrical resistances of the thermal conductivity cells.

5. In an apparatus for automatic analysis of carbon monoxide in a gaseous mixture containing carbon monoxide and hydrogen by the thermal conductivity method, the combination of two valved conduits adapted for taking contemporaneous samples of the gaseous mixture to be analyzed, one of said conduits communicating successively with a conduit adapted for the controlled addition of steam thereto, a heated reaction chamber containing a steam-carbon monoxide converting catalyst, a condenser, a trap, a carbon dioxide absorber, and a thermal conductivity cell; the second of said first-named conduits communicating with a second thermal conductivity cell and being of such dimensions that two contemporaneously taken samples will arrive substantially simultaneously at their responsive conductivity cells; said cells being connected as two arms of a Wheatstone bridge.

In testimony whereof I affix my signature.
JOHN S. BEEKLEY.

CERTIFICATE OF CORRECTION.

Patent No. 1,893,490.  January 10, 1933.

JOHN S. BEEKLEY.

It is hereby certified that error appears in the printed specification of the above numbered patent requiring correction as follows: Page 3, line 81, claim 5, for "responsive" read "respective"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.